UNITED STATES PATENT OFFICE.

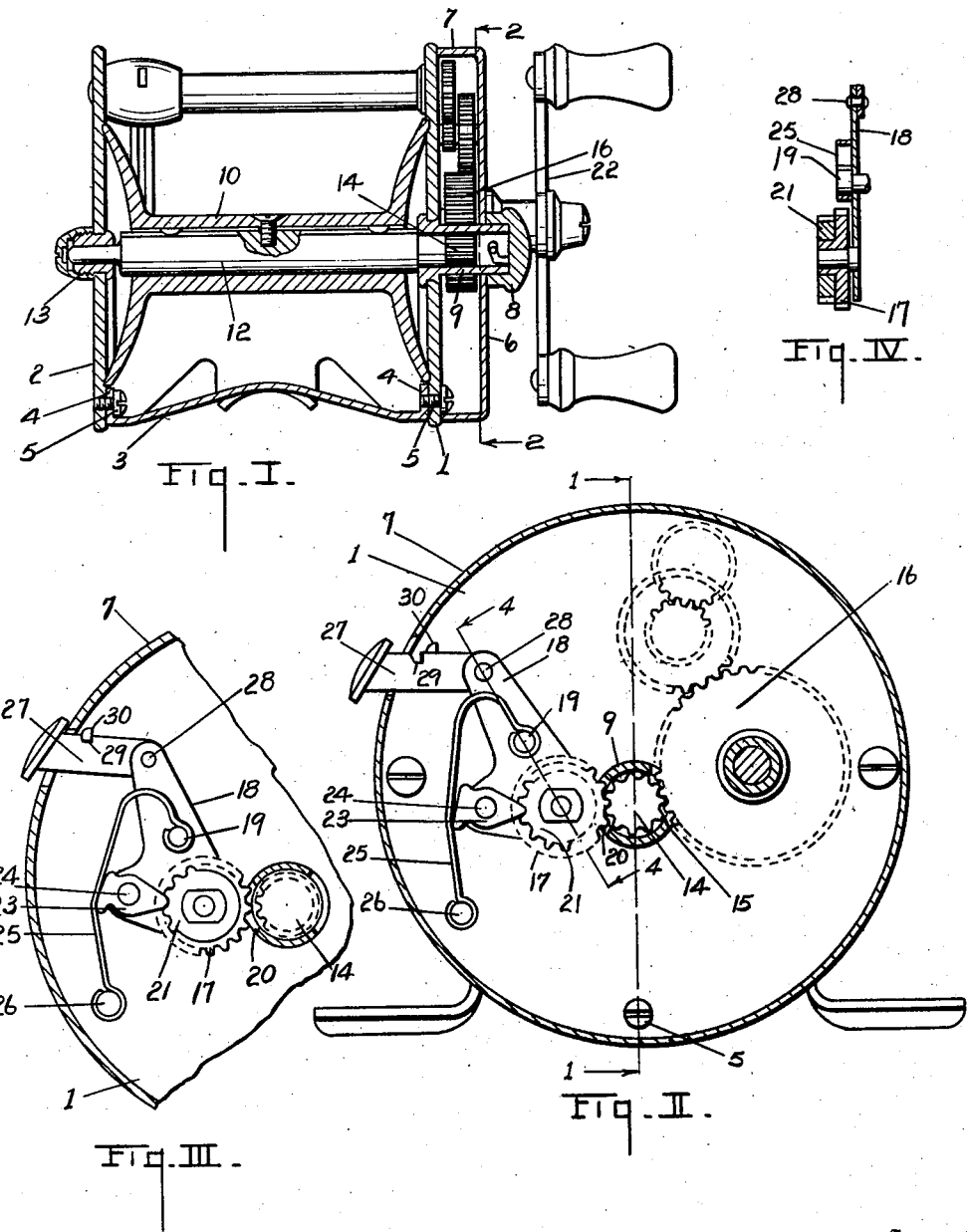

WILLIAM SCHMID, OF BRONSON, MICHIGAN.

FISHLINE REEL.

1,417,633.   Specification of Letters Patent.   Patented May 30, 1922.

Original application filed September 5, 1919, Serial No. 321,910. Divided and this application filed August 9, 1920. Serial No. 402,138.

*To all whom it may concern:*

Be it known that I, WILLIAM SCHMID, a citizen of the United States, residing at Bronson, county of Branch, State of Michigan, have invented certain new and useful Improvements in Fishline Reels, of which the following is a specification.

This invention relates to improvements in fish line reels.

The main objects of this invention are to provide in a fish line reel an improved click mechanism.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a longitudinal section on a line corresponding to line 1—1 of Fig. II, parts being shown in full lines and parts broken away for convenience in illustration.

Fig. II is a transverse section on a line corresponding to line 2—2 of Fig. I, the rim of the head member being omitted.

Fig. III is a detail view corresponding to that of Fig. II, showing the click mechanism in operative position.

Fig. IV is a detail section through the click mechanism on a line corresponding to line 4—4 of Fig. II.

In the drawing similar reference characters refer to similar parts throughout the several views, and the sectional views are taken looking in the direction of the little arrows at the ends of the section lines.

In the accompanying drawing I have illustrated my improvements as embodied in a reel of the type shown in my application for Letters Patent filed September 5, 1919, Serial No. 321,910, this application being a division of such application.

The frame of my improved reel as is described in detail in my said application comprises a pair of end members 1 and 2 connected by longitudinal frame member 3, formed as a stamping and having upturned flanges 4 at its ends secured to the frame member by the screws 5.

I provide a head member 6 having a peripheral flange 7, the head member being retained with its flange against the end member by the cap 8 having a bayonet slot and pin joint connection with the tubular bearing member 9 carried by the end member 1 and projecting through the head member 6.

The spool 10 is provided with a shaft 12 journaled at one end in the bearing 9 and at the other end in the bearing 13 carried by the end plate 2. The spool shaft is provided with a pinion 14, the bearing 9 having an opening 15 therein permitting the meshing of the driving gear 16 with the pinion as shown in Fig. II. The driving gear is connected to the crank 22. These parts are described in detail in my said application.

My improved detent comprises a pinion 17 mounted on a support 18 which is pivoted at 19, so that it may be adjusted to swing the pinion 17 in and out of mesh with the spool pinion as shown in Figs. II and III, the bearing 9 being provided with an opening 20, permitting the meshing of these gears.

The pinion 17 has a detent pinion 21 connected thereto. The detent or click 23 is pivoted at 24 on the support to coact with this pinion 21, being continuously in engagement therewith.

A spring 25 is mounted on the end member 1 at 26 and engaged with the pivot 19 so that it acts upon the detent and also urges the support to its pinion engaging position.

A latch 27 pivoted on the upper end of the support at 28 is notched at 29 to engage a keeper 30 on the end plate 1 of the frame, so that an inward and upward push on the latch disengages the click driving pinion and engages the latch with the keeper. When the latch is released by a downward push thereon, the spring throws the click driving pinion into mesh.

It is a quite general practice to arrange the click so that it engages the spool pinion thereby subjecting the same to wear. This is avoided by my improvements.

I have illustrated and described my improved click mechanism as embodied in my improved reel structure of my said application. My click mechanism, however, has the advantage of being adaptable for embodiment in fishing reels of other general structure.

Having thus described my invention, what I claim as new and desire to secure by Letters Patent is:

1. In a fishing reel, the combination with a frame provided with a head chamber, a spool provided with a pinion disposed in said chamber, driving means for said spool, a click pinion, a driving pinion secured thereto, a support for said click pinion pivotally mounted within said head chamber, said support being adjustable to bring said click driving pinion into and out of mesh with said spool pinion, a click pivotally mounted on said support to coact with said click pinion, a spring acting on said click and urging said support into operative position, and a latch for holding said support in inoperative position projecting from said head chamber.

2. In a fishing reel, the combination with a frame provided with a head chamber, a spool provided with a pinion disposed in said chamber, driving means for said spool, a click pinion, a driving pinion secured thereto, a support for said click pinion pivotally mounted within said head chamber, said support being adjustable to bring said click driving pinion into and out of mesh with said spool pinion, a click pivotally mounted on said support to coact with said click pinion, and a spring acting on said click and urging said support into operative position.

3. In a fishing reel, the combination with a frame provided with a head chamber, a spool provided with a pinion disposed in said chamber, driving means for said spool, a click pinion, a driving pinion secured thereto, a support for said click pinions pivotally mounted within said head chamber, said support being adjustable to bring said click driving pinion into and out of mesh with said spool pinion, a click pivotally mounted on said support to coact with said click pinion, a latch pivoted on said support and projecting from said head chamber and a keeper on said head coacting with said latch to hold the parts in operative position.

In witness whereof, I have hereunto set my hand and seal in the presence of two witnesses.

WILLIAM SCHMID. [L. S.]

Witnesses:
ADA SCHMID,
WM. H. DAVIS.